United States Patent
Hosokawa et al.

(10) Patent No.: US 8,467,106 B2
(45) Date of Patent: Jun. 18, 2013

(54) IMAGE PROCESSING APPARATUS AND INFORMATION WRITING APPARATUS

(75) Inventors: Takahiro Hosokawa, Nagoya (JP); Masashi Suzuki, Nagoya (JP); Hiroshi Koie, Nagoya (JP); Kazunari Taki, Nagoya (JP); Hideo Ueno, Nagoya (JP); Takahiro Ikeno, Seto (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 640 days.

(21) Appl. No.: 12/028,890

(22) Filed: Feb. 11, 2008

(65) Prior Publication Data

US 2008/0212142 A1 Sep. 4, 2008

(30) Foreign Application Priority Data

Mar. 2, 2007 (JP) ................................. 2007-052311

(51) Int. Cl.
*H04N 1/40* (2006.01)
*G06K 9/00* (2006.01)
*G05B 19/00* (2006.01)

(52) U.S. Cl.
USPC .................. 358/3.28; 358/1.13; 382/100

(58) Field of Classification Search
None
See application file for complete search history.

(56) References Cited

U.S. PATENT DOCUMENTS

| | | | |
|---|---|---|---|
| 6,396,594 B1* | 5/2002 | French et al. | 358/1.18 |
| 7,738,743 B2* | 6/2010 | Hino | 382/306 |
| 2003/0179412 A1* | 9/2003 | Matsunoshita | 358/3.28 |
| 2003/0217274 A1* | 11/2003 | Nagatsuka | 713/179 |
| 2004/0194133 A1* | 9/2004 | Ikeda et al. | 725/37 |
| 2004/0196485 A1* | 10/2004 | Hikichi et al. | 358/1.13 |
| 2004/0233040 A1* | 11/2004 | Lane et al. | 340/5.86 |
| 2005/0141003 A1* | 6/2005 | Yamamoto et al. | 358/1.12 |
| 2005/0264852 A1* | 12/2005 | Kaburagi et al. | 358/3.28 |
| 2006/0210108 A1* | 9/2006 | Brunk et al. | 382/100 |
| 2006/0274352 A1* | 12/2006 | Nakaguma et al. | 358/1.14 |
| 2007/0019244 A1* | 1/2007 | Rekiere | 358/3.28 |
| 2007/0083381 A1* | 4/2007 | Farrell et al. | 705/1 |
| 2007/0223955 A1* | 9/2007 | Kawabuchi et al. | 399/80 |

FOREIGN PATENT DOCUMENTS

| | | |
|---|---|---|
| JP | 2001-266112 A | 9/2001 |
| JP | 2003-025679 | 1/2003 |
| JP | 2003-094781 | 4/2003 |
| JP | 2004-112517 A | 4/2004 |
| JP | 2004-228897 | * 12/2004 |
| JP | 2005-157745 | 6/2005 |
| JP | 2005-255358 | 9/2005 |
| JP | 2006-253989 A | 9/2006 |

(Continued)

OTHER PUBLICATIONS

JP Office Action dtd Jul. 7, 2009, JP Appln. 2007-052311, partial English translation.

(Continued)

*Primary Examiner* — Barbara Reinier
(74) *Attorney, Agent, or Firm* — Banner & Witcoff, Ltd.

(57) ABSTRACT

An image processing apparatus includes: a receiving unit which receives print data; a determining unit which determines whether or not the print data received by the receiving unit includes confidential information; a printing unit which prints an image on a recording medium including an IC tag, in accordance with the print data; and a writing unit which writes, into the IC tag of the recording medium, distinctive information indicating that confidential information is printed on the recording medium when it is determined that the print data includes confidential information.

4 Claims, 10 Drawing Sheets

FOREIGN PATENT DOCUMENTS

| | | |
|---|---|---|
| JP | 2006-261907 A | 9/2006 |
| JP | 2006-272674 A | 10/2006 |
| JP | 2006-279545 A | 10/2006 |
| JP | 2006-352330 A | 12/2006 |

OTHER PUBLICATIONS

JP Office Action dtd Jan. 6, 2009, JP Appln. No. 2005-013692, partial translation.

* cited by examiner

IMAGE PROCESSING APPARATUS AND INFORMATION WRITING APPARATUS

CROSS-REFERENCE TO RELATED APPLICATION

This application claims priority from Japanese Patent Application No. 2007-052311, filed on Mar. 2, 2007, the entire subject matter of which is incorporated herein by reference.

TECHNICAL FIELD

Aspects of the present invention relate to an image processing apparatus and information writing apparatus including a writing unit which writes information into an IC tag attached to a recording medium.

BACKGROUND

Nowadays, awareness of protecting the environment by recycling of resources or cutting down of a waste of resources etc., is growing on a global scale, and processing for separating resources has become popular.

In an image processing apparatus such as a laser printer, JP-A-2005-255358 describes a technique of separating recording media, such as sheets, in accordance with the type of a recording medium, a ratio of a print area to an area of a recording medium, or the like.

The image forming apparatus as described in JP-A-255358 uses recording media equipped with IC tags capable of storing information, thereby separating the recording media from each other in accordance with information read from the IC tags.

However, in JP-A-2005-255358, recording media are separated without consideration of an image to be printed on a recording medium. Therefore, for instance, a recording medium on which confidential information is printed can be mixed in the recording media separated as high quality sheets.

For this reason, confidential documents separated as high quality sheets can be recycled without being disposed of, thereby increasing the risk of leakage of confidential information.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an image processing apparatus and an information writing apparatus which write information used for separating a recording medium according to presence or absence of confidentiality, based on an image content to be printed on the recording medium, on an IC tag attached to the recording medium.

According to an exemplary embodiment of the present invention, there is provided an image processing apparatus which includes: a receiving unit which receives print data; a determining unit which determines whether or not the print data received by the receiving unit includes confidential information; a printing unit which prints an image on a recording medium including an IC tag, in accordance with the print data; and a writing unit which writes, into the IC tag of the recording medium, distinctive information indicating that confidential information is printed on the recording medium when it is determined that the print data includes confidential information.

According to another exemplary embodiment of the present invention, there is provided an image processing apparatus which includes: a reading unit which reads image information from an image on a first recording medium; a determining unit which determines whether or not the image information read by the reading unit includes confidential information; a printing unit which prints an image on a second recording medium including an IC tag, in accordance with the image information; and a writing unit which writes, into the IC tag of the second recording medium, distinctive information indicating that confidential information is printed on the second recording medium when it is determined that the image information includes confidential information.

According to another exemplary embodiment of the present invention, there is provided an information writing apparatus which includes: a reading unit which reads image information from an image on a recording medium including an IC tag; a determining unit which determines whether or not the image information read by the reading unit includes confidential information; and a writing unit which writes, into the IC tag of the recording medium, distinctive information indicating that confidential information is printed on the recording medium when it is determined that the image information includes confidential information.

According to another exemplary embodiment of the present invention, there is provided an information processing unit which includes: an obtaining unit which obtains image data; a determining unit which determines whether or not the image data includes security data; and a writing unit which writes, into an IC tag embedded in a recording medium, on which image based on the image data is to be printed or has been printed, information based on the security data when it is determined that the image data includes security data.

According to the above configuration, information used for distinguishing a recording medium according to presence or absence of confidentiality can be written, based on an image content printed on the recording medium, into an IC tag attached to the recording medium.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

<First Exemplary Embodiment>

Figure 1:
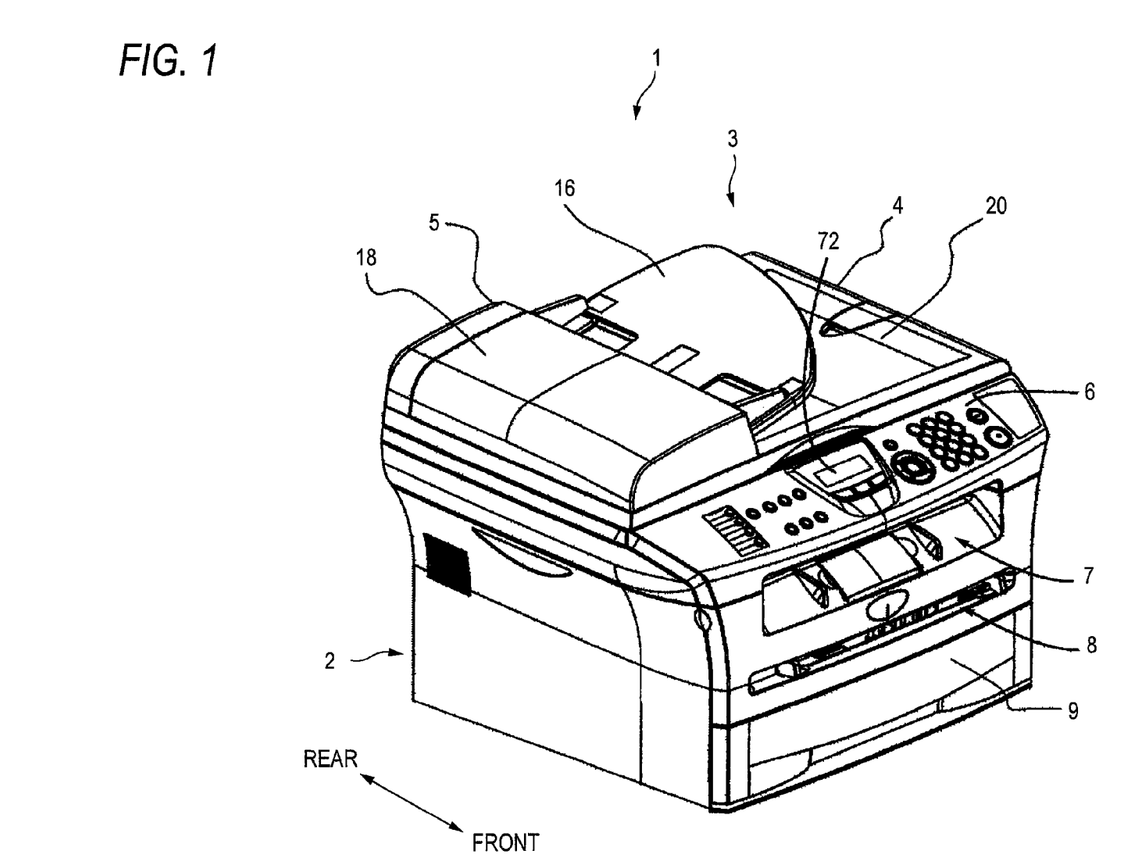
FIG. 1 is a perspective view showing the external view of a printer according to exemplary embodiments of the present invention.
Figure 2:
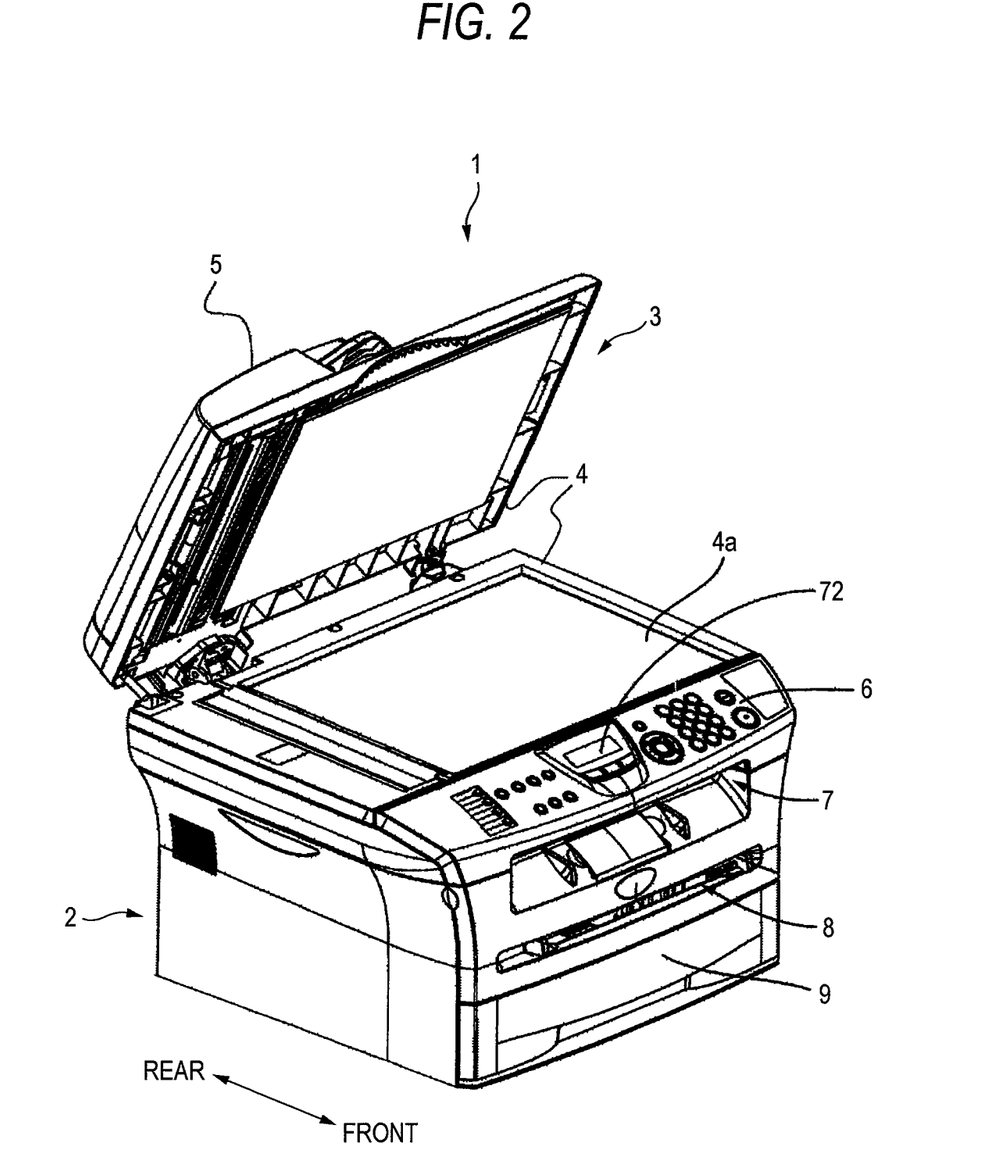
FIG. 2 is a perspective view showing the external view of the printer when an image reading unit is opened.
Figure 3:
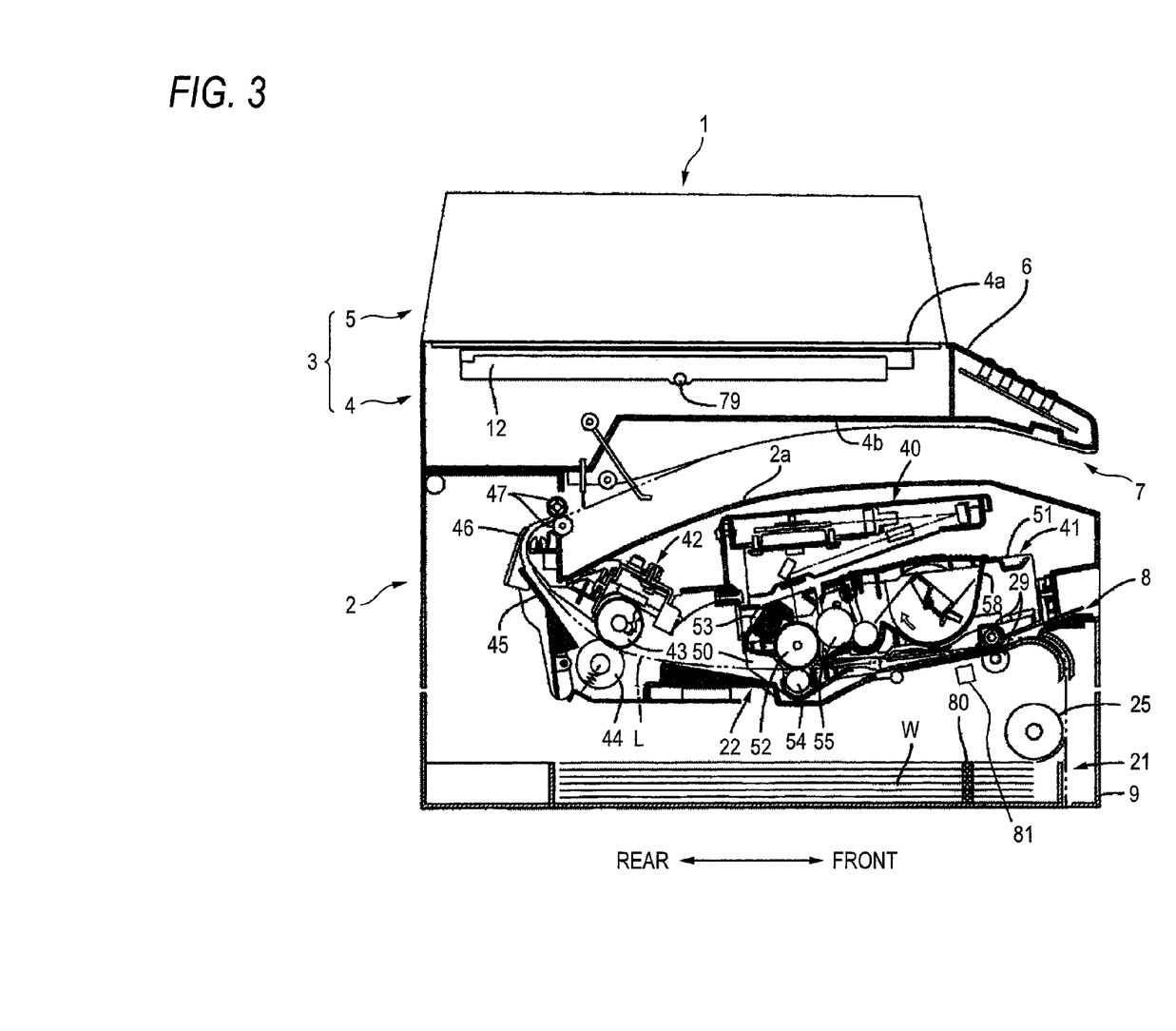
FIG. 3 is a side cross-sectional view of the printer as viewed from an axial direction of a sheet feeding roller.

A first exemplary embodiment of the present invention will be described with reference to the drawings. FIG. 1 is a perspective view showing the external view of a printer. FIG. 2 is a perspective view showing the external view of the printer when an image reading unit is opened. FIG. 3 is a side cross-sectional view of the printer as viewed from an axial direction of a sheet feeding roller. In the following descriptions, a side of the printer provided with an operation section 6 in FIG. 1 is taken as the "front," and an opposite side is taken as the "rear" as shown in the arrow. In FIGS. 2 and 3, "front" and "rear" are taken as shown in the arrows.

[Configuration of the Printer 1]

The printer 1 includes an image forming unit 2 which has a sheet feeding section 21 and an image forming section 22, and the like; and an image reading unit 3.

The image forming unit 2 includes the operation section 6 which receives a various operations, for example, by a user and a display section 72 which is made up of a liquid-crystal panel, or the like, displays various settings and is provided at the front of an FB 4 (which will be described later).

A sheet removal port 7 opened in communication with a sheet discharging tray 2a (which is shown in FIG. 3 and which will be described later) is formed below the operation section 6. A manual sheet feeding port 8 opened in the form of a slit is formed at a position below the sheet removal port 7. A sheet feeding cassette 9 is positioned below the manual sheet feeding port 8.

(Configuration of the Image Forming Unit 2)

The image forming unit 2 includes a sheet feed section 21 which feeds an IC sheet W, which will be described later, an image forming section 22 which forms (prints) an image on the fed IC sheet W, and the like. The image forming section 22 includes the sheet discharging tray 2a which is provided in the upper portion thereof and is used for holding IC sheets W on which images have been formed by the image forming section 22 and which have been discharged.

(Configuration of the Sheet Feeding Section 21)

The sheet feeding section 21 includes: the sheet feeding cassette 9; a sheet press plate (not shown) which is provided in the sheet feeding cassette 9 and is movable; a sheet feed roller 25 provided at a position above the front end of the sheet feeding cassette 9; and the like.

The sheet feeding cassette 9 is disposed in a lower portion of the image forming unit 2 and provided to the printer 1 removably from the front. Sheets are loaded in the sheet feeding cassette 9, and the sheets in the sheet feeding cassette 9 are fed one by one by the sheet feed roller 25 and sequentially conveyed to a registration roller 29.

In the first exemplary embodiment, IC sheets W equipped with Radio Frequency Identification (RFID) tags (hereinafter referred to as "IC tags") 80 which transmit and receive radio waves by means of antennas (not shown) are loaded in the sheet feeding cassette 9.

Figure 5:
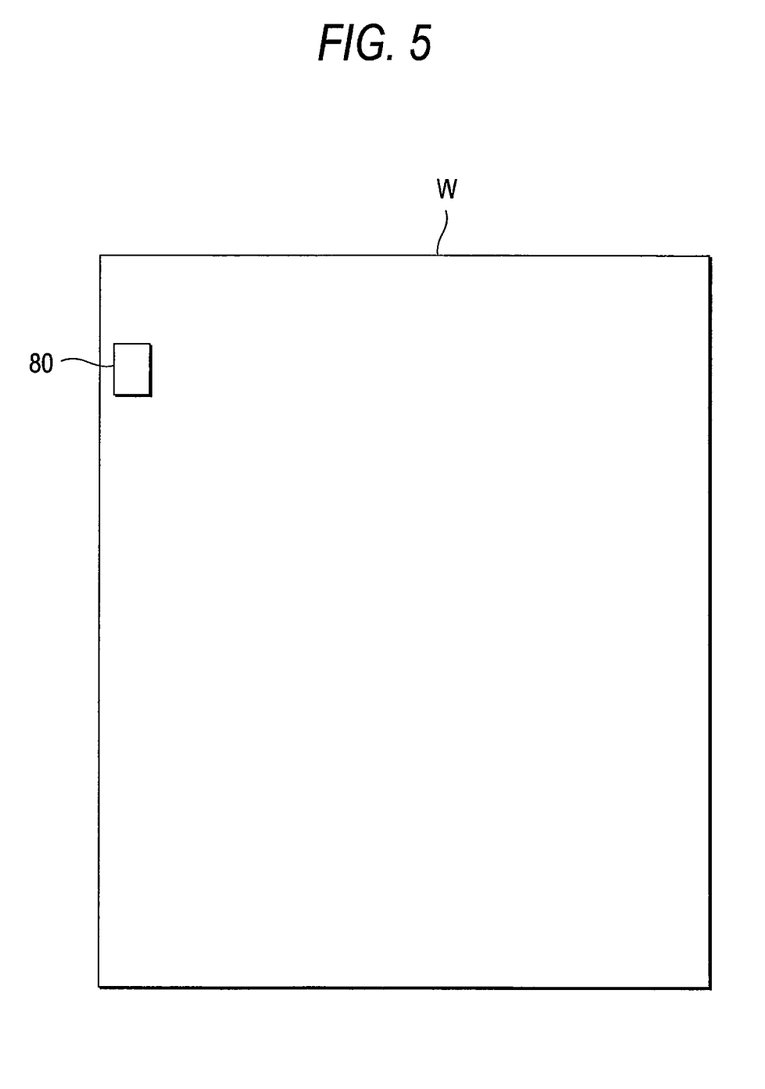
FIG. 5 is a schematic view of an IC sheet in which an IC tag is embedded.

As shown in, for instance, FIG. 5, the IC tag 80 is embedded in a margin area of the IC sheet W when printed. The IC sheet W can be printed as is an ordinary sheet. A position where the IC tag 80 is embedded may be set anywhere the tag does not affect printing, such as any of four corners of the IC sheet W.

The registration roller 29 includes a pair of rollers and is disposed downstream of the sheet feed roller 25 in a sheet conveying direction. The registration roller 29 corrects skewed travel of the IC sheet W conveyed by the sheet feed roller 25 and sends the IC sheet W to the image forming section 22.

(Configuration of an IC Reader/Writer 81)

The IC sheets W are conveyed along a conveyance path L. On the conveyance path L, an IC reader/writer 81 is provided downstream of the registration roller 29 in the sheet conveying direction.

The IC reader/writer 81 transmits radio waves from an antenna (not shown), thereby establishing communication with the IC tag 80 of the IC sheet W conveyed from the registration roller 29 and identifying the IC tag 80. The IC reader/writer 81 writes information into the identified IC tag 80, if necessary.

(Configuration of the Image Forming Section 22)

The image forming section 22 includes a scanner unit 40, a process unit 41, a fixing unit 42, and the like.

As shown in FIG. 3, the scanner unit 40 is provided in the upper portion of the image forming unit 2. The scanner unit 40 irradiates a surface of a photosensitive drum 52 in the process unit 41 (described later) with a laser beam (indicated by a dashed line in FIG. 3) which is emitted by a laser emission section (not shown) based on image data by high-speed scanning.

The process unit 41 is removably provided in the main body section of the image forming unit 2.

The process unit 41 includes a drum cartridge 50 and a developing cartridge 51.

The drum cartridge 50 includes the photosensitive drum 52, a scorotoron electrifier 53, and a transfer roller 54. The developing cartridge 51 includes a developing roller 55 and a toner box 58 storing toner.

A surface of the photosensitive drum 52 is positively charged in a uniform manner by means of the scorotoron electrifier 53. The positively-charged surface of the photosensitive drum 52 is exposed to high-speed scan of the laser beam from the scanner unit 40. An electrostatic latent image based on the image data is created on the exposed surface of the photosensitive drum 52.

Next, the toner which is carried on the developing roller 55 and which is positively charged is supplied to the electrostatic latent image created on the surface of the photosensitive drum 52.

The electrostatic latent image (a toner image) which is carried on the surface of the photosensitive drum 52 and which is made visible by the supplied toner is transferred to the IC sheet W which passes between the photosensitive drum 52 and the transfer roller 54. The IC sheet W on which the toner image has been transferred is conveyed to the fixing unit 42 by rotation of the photosensitive drum 52 and the transfer roller 54.

The fixing unit 42 is disposed downstream of the process unit 41 in the sheet conveying direction. The fixing unit 42 includes a heating roller 43 which heats and melts the toner on the transferred IC sheet W and a pressing roller 44 which presses the IC sheet W toward the heating roller 43.

The fixing unit 42 fixes the toner image created on the IC sheet W by the process unit 41 by subjecting the image to heating and pressurization during the course of the sheet passing between the heating roller 43 and the pressing roller 44.

The IC sheet W on which the toner image is fixed is conveyed to a discharging roller 47 along a sheet discharging path made by guide members 45 and 46. The discharging roller 47 discharges the thus-conveyed IC sheet W onto the sheet discharging tray 2a.

As mentioned above, the IC sheets W loaded in the sheet feeding cassette 9 are conveyed along a conveyance path L from the sheet feeding section 21 to the image forming section 22 while an image are formed thereon. The sheets are then discharged to the sheet discharging tray from the image forming section 22.

(Configuration of the Image Reading Unit 3)

Figure 4:
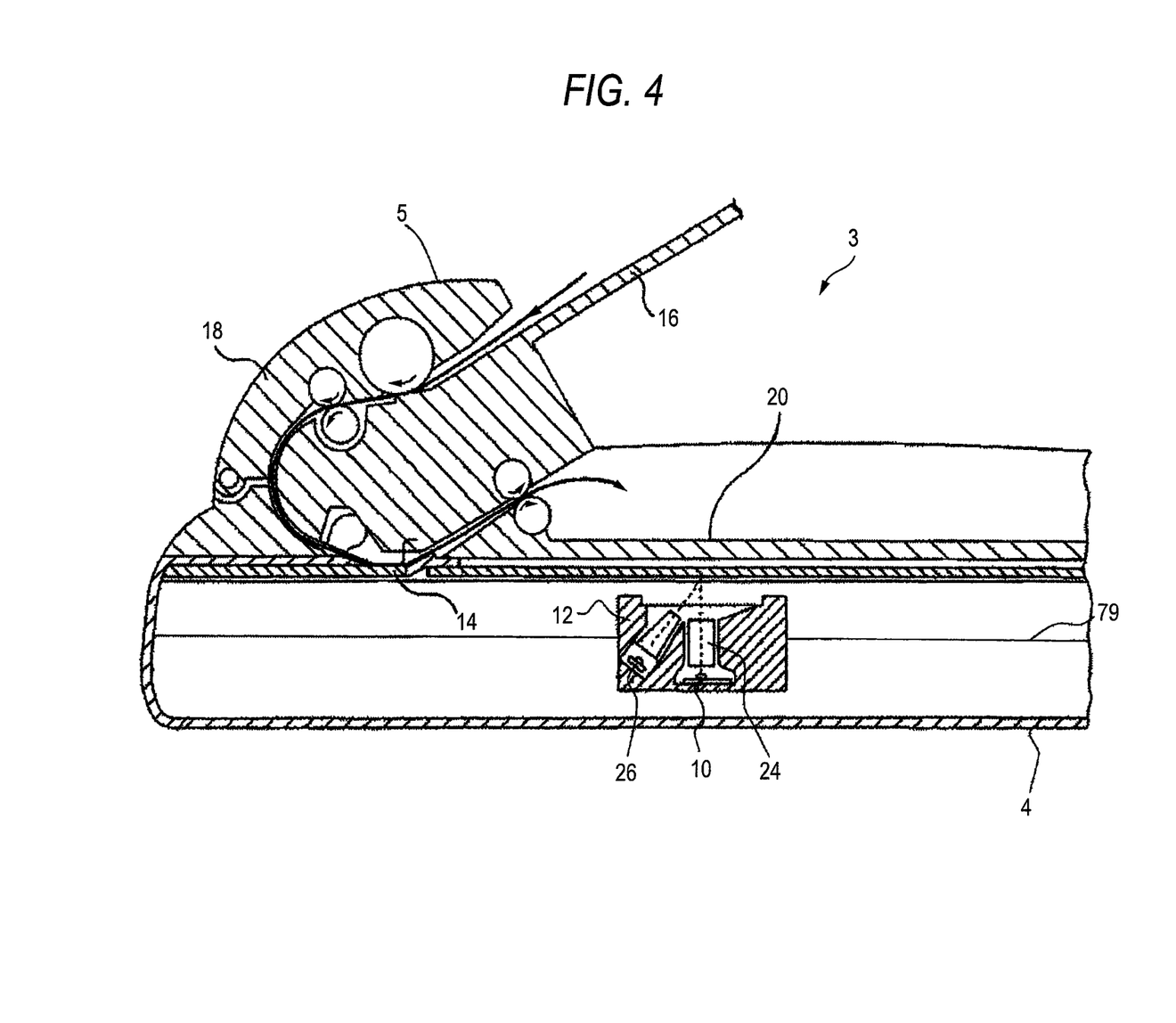
FIG. 4 is a schematic cross-sectional view of the image reading unit when the unit is split along a plane parallel to the front surface and the rear surface (a back surface) of the printer.

Configuration of the image reading unit 3 will now be described with reference to FIGS. 1 to 4. FIG. 4 is a schematic cross-sectional view of the image reading unit 3 when the unit is split along a plane parallel to the front surface and the rear surface (a back surface) of the printer 1.

As shown in FIGS. 1 and 2, the image reading unit 3 includes a flatbed reader (hereinafter referred to as "FB") 4 equipped with a rectangular document table 4a and disposed on the upper surface of the image forming unit 2, and an automatic document feeder (hereinafter referred to as "ADF") 5 disposed on the FB 4. As shown in FIG. 3, the image reading unit 3 is arranged above the sheet discharging tray 2a of the image forming unit 2 in such a way that a lower surface 4b opposes and covers the sheet discharging tray 2a.

(Configuration of the FB 4)

The FB 4 is configured as a flatbed scanner and includes the document table 4a and a contact image sensor 12. As shown in FIG. 2, the FB 4 is pivotally supported so as to be able to open with respect to a rear end of the upper surface of the image forming unit 2. When the FB 4 is opened upwardly, the document table 4a becomes exposed (see FIG. 2). The FB is configured such that reading, such as copying, can be performed while various documents, such as books or others, are placed on the document table 4a.

As shown in FIG. 4, the contact image sensor 12 includes a light-receiving section (a photoelectric conversion element) 10, a SELFOC lens 24, and a light source 26. The contact image sensor 12 is configured so as to emit light to the document from the light source 26 and cause light reflected from the document to converge to, in the form of an image, on the light-receiving section 10 by means of the SELFOC lens 24, thereby reading image information about the document. The contact image sensor 12 is driven by a drive mechanism (not shown) along an axis 79 extending in a horizontal direction orthogonal to a longitudinal direction of the printer 1.

(Configuration of the ADF 5)

As shown in FIGS. 1 and 4, the ADF 5 is provided on the upper surface of the FB 4, and includes a document placement table 16, a document conveying mechanism 18, and a document discharging tray 20.

The document placement table 16 is configured so as to allow placement of an arbitrary number of documents. A direction in which a document is placed may be either a lateral or longitudinal direction.

The document conveying mechanism 18 feeds the documents placed on the document placement table 16 one by one; conveys the fed document to a read position 14 where image information about the document is read; and discharges the document whose image information has been read, to the document discharging tray 20.

The document discharging tray 20 serves as the upper surface of the FB 4, and the documents discharged from the document conveyance mechanism 18 are sequentially loaded on the document discharging tray 20.

A reading start command has been issued for a document set on either the FB 4 or the ADF 5 through the operation section 6 of the printer 1 or an operation section 61 of a PC 60. When reading is performed while the document is placed on the document table 4a of the FB 4, the contact image sensor 12 is moved along the axis 79 and the document table 4a, and the contact image sensor 12 reads the document line by line.

In contrast, when the document is read by utilization of the ADF 5, the contact image sensor 12 stays at the reading position 14, and the contact image sensor 12 reads, line by line, the document conveyed by the ADF 5.

Electrical Configuration of the Print System

Figure 6:
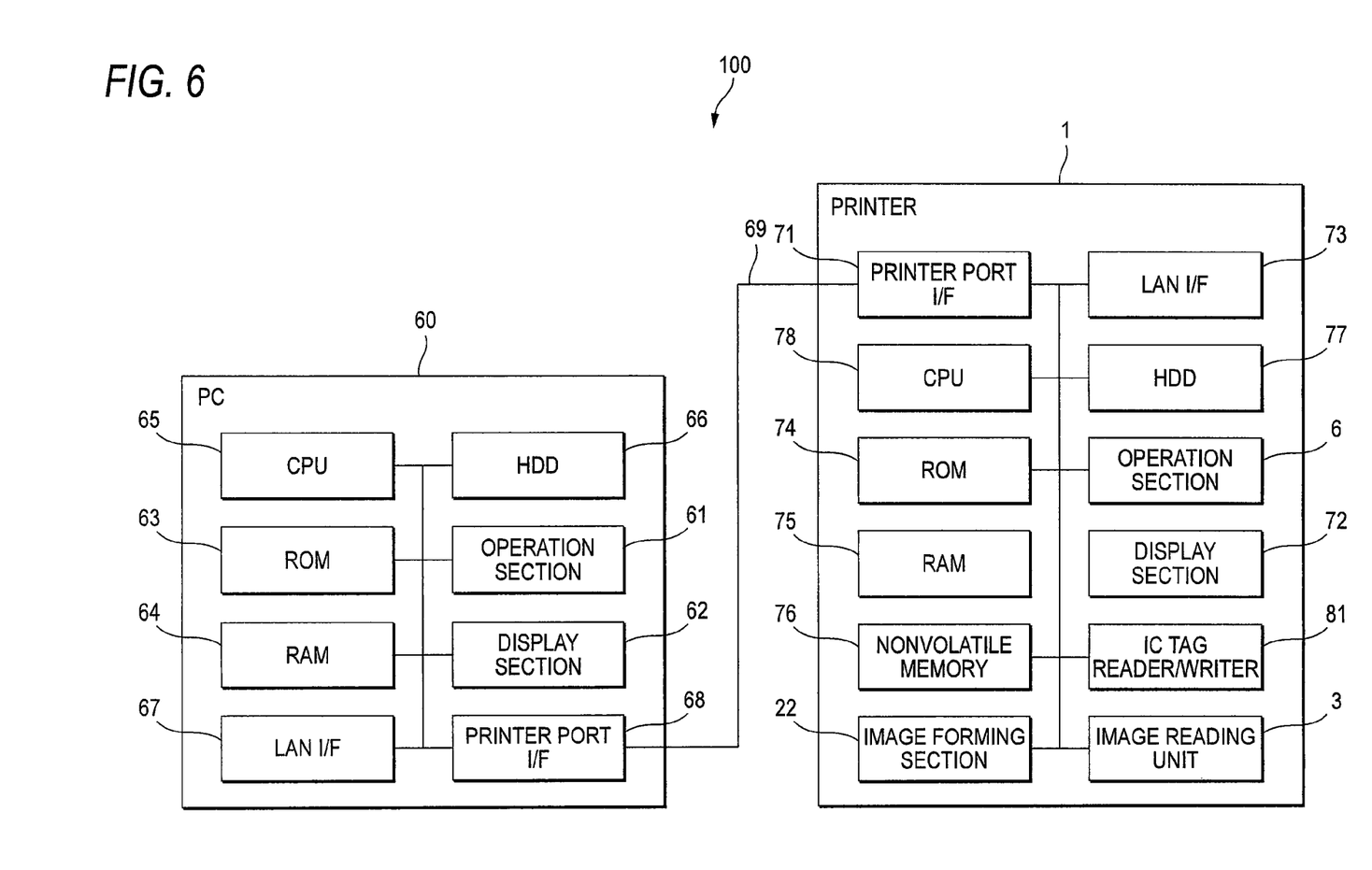
FIG. 6 is a block diagram showing the electrical configuration of a print system according to exemplary embodiments of the present invention.

FIG. 6 is a block diagram showing the electrical configuration of the print system according to exemplary embodiments of the present invention. As shown in FIG. 6, the printer 1 is coupled to the personal computer 60 (hereinafter referred to as "PC") through a cable 69. Upon receipt of print data transmitted from the PC 60, the printer 1 performs print processing in accordance with the received print data. The printer 1 and the PC 60 may also be coupled with each other through a network such as a LAN.

(Electrical Configuration of the PC 60)

The PC 60 includes the operation section 61 which receives input operation from the outside (input means, for example, a keyboard or a mouse); a display section 62 such as a display which displays an image; ROM 63; RAM 64; a CPU 65; a hard disk drive (HDD) 66; a LAN interface 67; and a printer port interface 68. Upon receiving an operation by the operation section 61, information, such as print data, can be sent or received through the printer port interface 68.

The display section 62 displays an image created by an application software or a setting screen, or the like, for printing an image.

The hard disk drive 66 stores an application software which creates an image to be printed, a printer driver of the printer 1 that performs printing, a watermark which is superimposed on the printed image through transmissive printing, and the like.

In accordance with a command from the operation section 61, the CPU 65 reads an application software, a printer driver, or the like, from the hard disk drive 66, thereby starting the software.

When the CPU 65 receives a print command from the operation section 61, various pieces of information required for printing are added to the head of a print job or the head of each of pages, or the watermark stored in the hard disk drive 66 is superimposed on the image data. The image data to which information is added or on which the watermark is superimposed are transmitted, as print data, through the printer point interface 68.

(Electrical Configuration of the Printer 1)

The printer 1 includes the operation section 6 which receives various input operations; the display section 72 which displays various settings; the IC tag reader/writer 81 which reads and writes information from and to the IC tag 80 embedded in the IC paper W; the image forming section 22 which creates (printing) an image on the IC sheet W; the image reading unit 3 which reads image information about the document; a LAN interface 73; ROM 74; RAM 75; non-volatile memory 76; a hard disk drive 77; a CPU 78; and a printer port interface 71. The printer port interface 71 is coupled to the PC 60, or the like, through the cable 69.

The CPU 78 performs various processing operations in accordance with a program stored in the ROM 74. The CPU 78 sends the image forming section 22 the print data received from the PC 60 through the printer port interface 71. The CPU 78 also sends the image forming section 22, as print data, the image information about the document read by the image reading unit 3. On the basis of a print setting or the information added to print data received from the PC 60, the image forming section 22 performs printing operation for printing an image in accordance with the print data on the IC sheet W.

[Control Operation]

Figure 7:
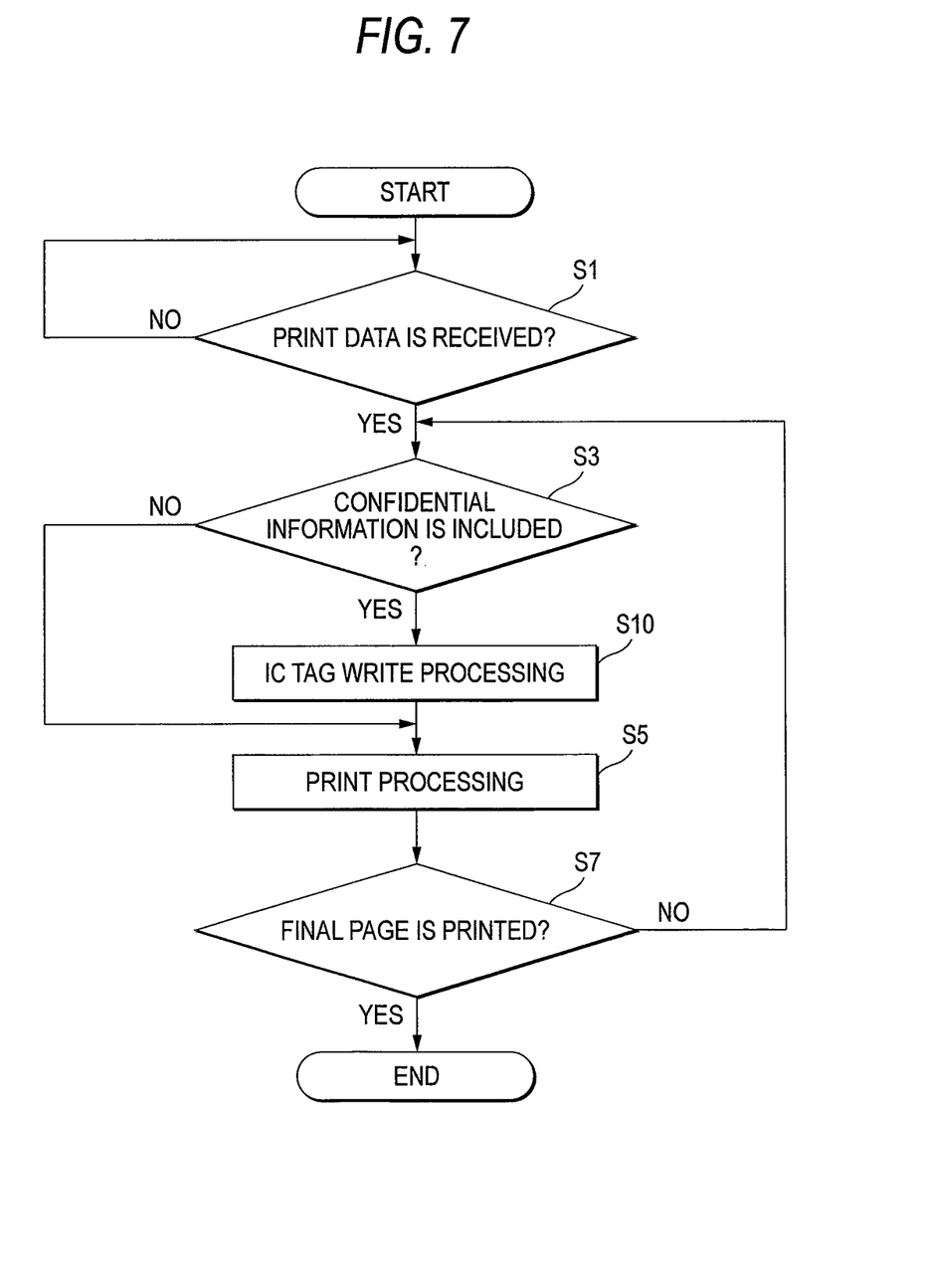
FIG. 7 is a flowchart showing a flow of main processing of the printer according to a first exemplary embodiment of the present invention.

Specifics of control operation performed by the printer 1 will now be described. FIG. 7 is a flowchart showing a flow of main processing of the printer 1 according to the first exemplary embodiment. Processing is controlled by the CPU 78.

(Main Processing)

As shown in FIG. 7, when main processing starts, it is determined whether or not print data has been received from the PC 60 (S1). When the print data is determined to be received (YES in S1), it is determined whether or not the print data include confidential information (S3).

The determination as to whether or not the print data include confidential information is made by determining whether or not information about a password set through the operation section 61 of the PC 60, information about a watermark such as "Company Secret," "Copying Prohibited," or the like, superimposed on the image data, information indicating that print data include confidential information, and the like, are added to the head of a print job or the head of each of pages of the print data.

In this way, it is determined whether or not print data include confidential information at S3.

When the print data are determined not to include confidential information (NO in S3), processing for printing an image based on the print data on the IC sheet W is performed (S5), and it is determined whether or not the print data being subjected to the print processing corresponds to a final page (S7).

In the meantime, when the print data are determined to include confidential information (YES in S3), the IC tag reader/writer 81 writes distinctive information into the IC tag 80 of the IC sheet W (S10). Print processing is performed (S5) after the processing for writing an IC tag at S10, and it is determined whether or not the print data being subjected to the print processing correspond to a final page (S7). The distinctive information may indicate that confidential information is printed on the IC sheet W in order to distinguish an IC sheet W on which confidential information is printed from an IC sheet W on which confidential information is not printed.

When the print data being subjected to the print processing is determined not to correspond to a final page (NO in S7), processing returns to a determination operation at S3. When the print data being subjected to the print processing is determined to correspond to the final page (YES in S7), processing ends.

As mentioned above, according to the first exemplary embodiment, information used for distinguishing an IC sheet W according to presence or absence of confidentiality can be written, based on an image content printed on the IC sheet W, into an IC tag 80 attached to the IC sheet W.

Therefore, when using a separating machine including an IC reader which reads the information written in the IC tag 80 and a separating mechanism for separating an IC sheet W according to whether or not the IC reader has read distinctive information, an IC sheet W on which a confidential image is printed and an IC sheet W on which no confidential image is printed can be separated from each other.

<Second Exemplary Embodiment>

Figure 8:
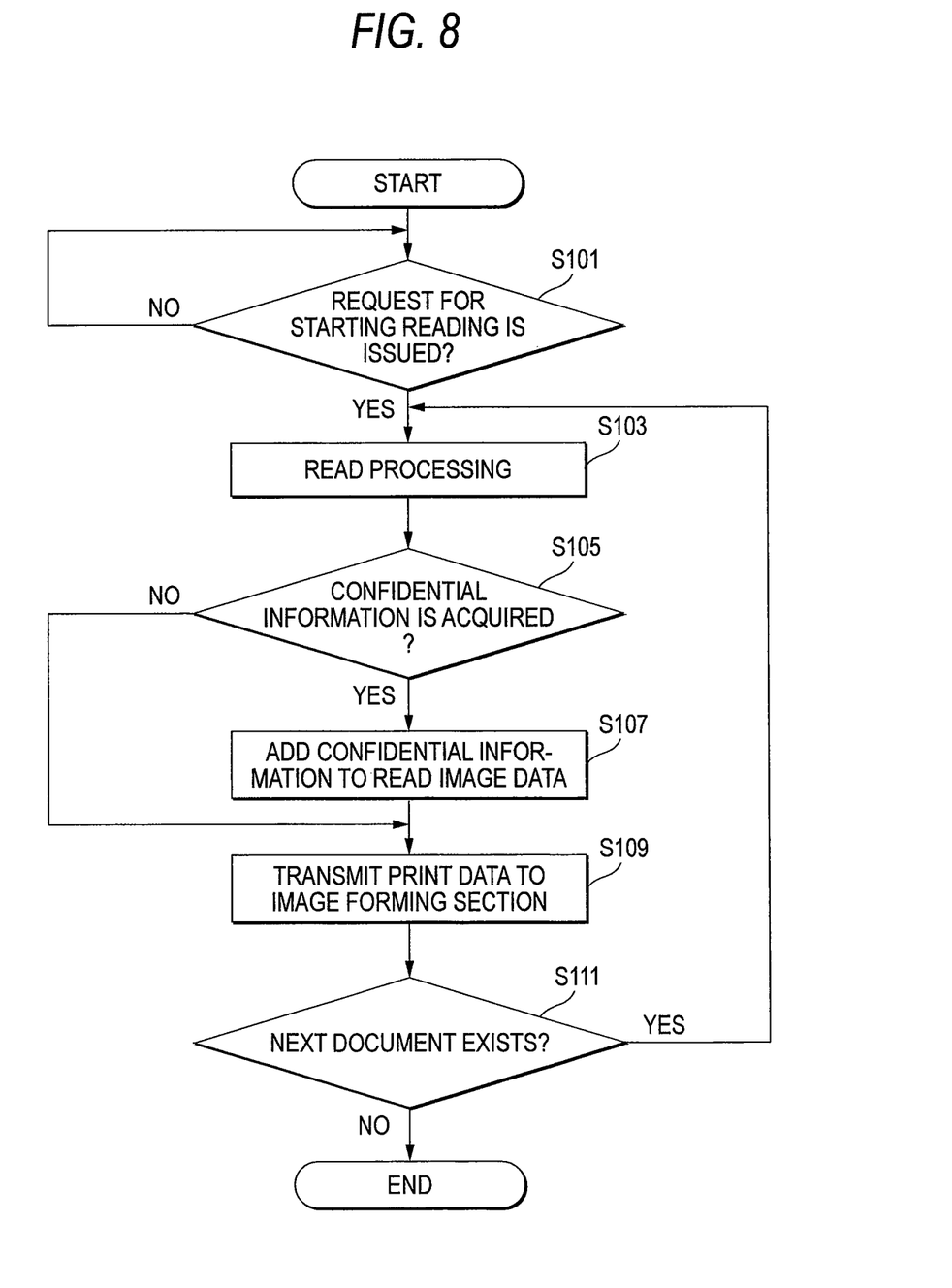
FIG. 8 is a flowchart showing a flow of image reading according to a second exemplary embodiment of the present invention.

A second exemplary embodiment of the present invention will now be described with reference to FIG. 8. FIG. 8 is a flowchart showing a flow of reading operation according to the second exemplary embodiment.

In the first exemplary embodiment, distinctive information is written into the IC sheet W on which a confidential image is to be printed, in accordance with the confidential information added to the print data received from the PC 60. However, in the second exemplary embodiment, distinctive information is written into the IC sheet W on which confidential information is to be printed, in accordance with image information read by the image reading unit 3.

Components which are identical with those of the first exemplary embodiment are assigned the same reference numerals, and their explanations are omitted.

As shown in FIG. 8, when reading operation starts, it is determined whether or not a reading start request has been issued for a document (not shown) set on either the FB 4 or the ADF 5 through the operation section 6 of the printer 1 or the operation section 61 of the PC 60 (S101). When the reading start request is determined to have been issued (YES in S101), image information about the document is read by the FB 4 or the ADF 5 (S103), and it is determined whether or not confidential information is acquired from the read image information (S105).

A determination as to whether or not confidential information is acquired from the read image information (image data) can be made by subjecting the image data to, for instance, Optical Character Recognition (OCR) processing to recognize characters in the image data and by determining whether or not a keyword corresponding to confidential information is included in the extracted character.

OCR (Optical Character Recognition) processing is processing which uses a known optical character recognition technique. Image data are checked against a pattern previously stored in the ROM 74 of the printer 1, whereby a character (a character code) included in image data is extracted. The ROM 74 stores a keyword corresponding to confidential information as a requirement for determining that the image data include confidential information. Specifically, for instance, the ROM 74 stores keywords corresponding to watermarks "Company Secret," "Copying Prohibited," and the like, or keywords corresponding to personal information such as "Mr. (Ms.) **," "090--**," and the like.

In addition to OCR processing, another determination method, such as a method for determining, through optical detection, whether or not a watermark is superimposed on a document, a method for determining whether or not read image data include confidential information, and the like, may also be employed.

When the confidential information is determined to have been acquired from the read image data (YES in S105), information indicating that image data include confidential information is added to the image data (S107), and the image data are transmitted as print data to the image forming section 22 (S109). In contrast, when confidential information is determined not to have been acquired from the read image data (NO in S105), the read image data are transmitted as it is as print data to the image forming section 22 (S109). Then, it is determined whether or not the next document exists. When the next document exists (YES in S111), processing returns to reading operation of S103. When the next document does not exist (NO in S111), this processing ends. The print data transmitted to the image forming section 22 in S109 is subjected to processing shown in FIG. 7 as in the first exemplary embodiment.

As mentioned above, according to the second exemplary embodiment, information used for distinguishing an IC sheet W according to presence or absence of confidentiality can be written, based on an image content printed on the IC sheet W, into an IC tag 80 attached to the IC sheet W.

Therefore, when using a separating machine including an IC reader which reads the information written in the IC tag 80 and a separating mechanism for separating an IC sheet W according to whether or not the IC reader has read distinctive information, an IC sheet W on which a confidential image is printed and an IC sheet W on which no confidential image is printed can be separated from each other.

<Third Exemplary Embodiment>

Figure 9:
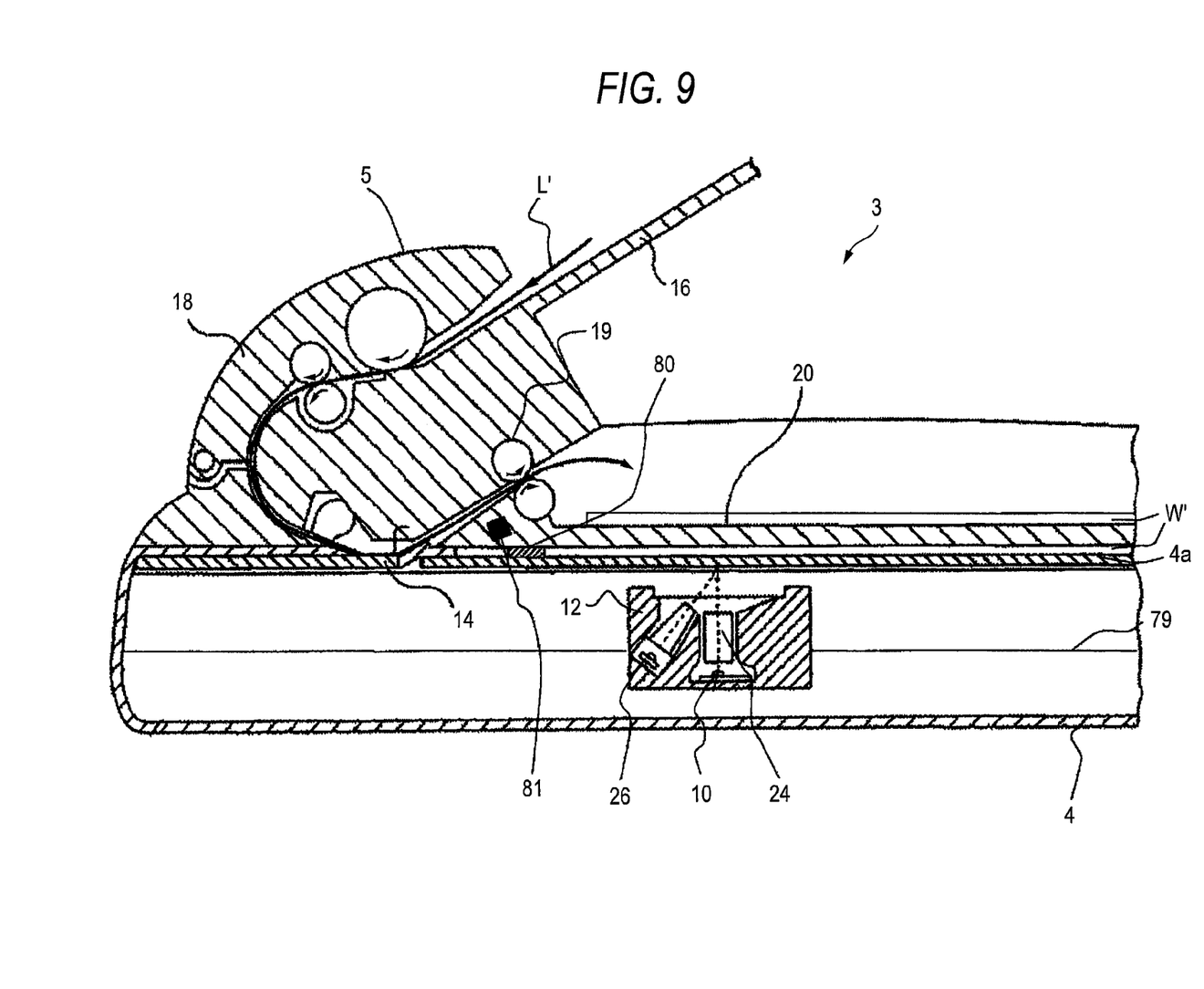
FIG. 9 is a schematic cross-sectional view of an image reading unit according to a third exemplary embodiment of the present invention when the unit is split along a plane parallel to the front surface and the rear surface of the printer.
Figure 10:
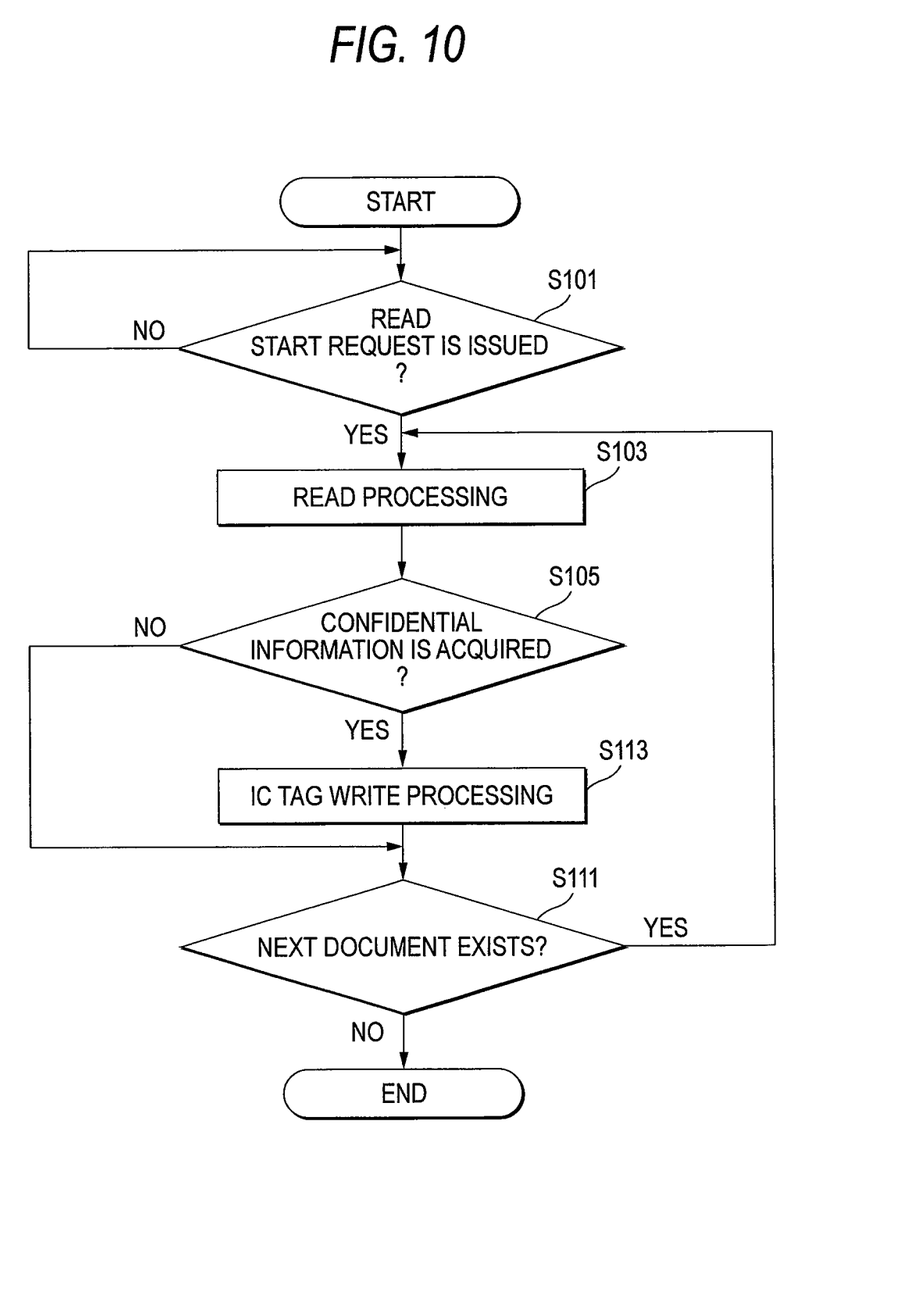
FIG. 10 is a flowchart showing a flow of main processing according to a third exemplary embodiment.

A third exemplary embodiment of the present invention will now be described with reference to FIGS. 9 and 10. FIG. 9 is a schematic cross-sectional view of the image reading unit 3 when the unit is split along a plane parallel to the front surface and the rear surface (a back surface) of the printer 1. FIG. 10 is a flowchart showing the flow of main processing according to the third exemplary embodiment.

In the third exemplary embodiment, a document W' equipped with an IC tag 80 is read by the image reading unit 3, thereby writing distinctive information in the document W' on which confidential information is printed.

Components which are identical with those of the first exemplary embodiment are assigned the same reference numerals, and their explanations are omitted.

(Configuration of the Image Reading Unit 3)

As shown in FIG. 9, the image reading unit 3 of the third exemplary embodiment includes the IC tag reader/writer 81. The IC tag reader/writer 81 is positioned downstream of the read position in the conveyance path L' along which a document W' is conveyed by the document conveyance mechanism 18 of the ADF 5 and close to the document discharging roller 19 which discharges the document W' onto the document discharging tray 20. The position of the IC tag reader/writer 81 also corresponds to a position located immediately above the document table 4a of the FB 4 where the document W' is to be placed. A radio communicable area of the IC tag reader/writer 81 is set so as to be communicable with the IC tag 80 of the document W' placed on the document table 4a of the FB or with the IC tag 80 of the document W' conveyed along the conveyance path L' of the ADF 5. The IC tag reader/writer 81 reads or writes information from or into the IC tag 80.

(Main Processing)

As shown in FIG. 10, in the third exemplary embodiment, a document W' including confidential information among the documents W' read by the image reading unit 3 is subjected to IC tag write processing, and print processing is not performed. Processing analogous to the read processing of the second exemplary embodiment as shown in FIG. 8 is performed up to the operation at which it is determined whether or not confidential information is acquired from the image data read in S105. When the confidential information is determined to have been acquired from the read image data (YES in S105), the IC tag reader/writer 81 (see FIG. 9) provided in the image reading unit 3 writes distinctive information into the IC tag 80 of the document W' placed on the FB 4 or the document W' conveyed along the conveyance path L' in the ADF 5 (S113).

As mentioned above, according to the third exemplary embodiment, information used for distinguishing a document W' according to presence or absence of confidentiality can be written, based on an image content printed on the document W', into an IC tag 80 attached to the document W'.

Therefore, when using a separating machine including an IC reader which reads the information written in the IC tag 80 and a separating mechanism for separating an document W' according to whether or not the IC reader has read distinctive information, a document W' on which a confidential image is printed and a document W' on which no confidential image is printed can be separated from each other.

<Other Exemplary Embodiments>

The present invention is not limited to the embodiments described by means of the foregoing descriptions and drawings, and following exemplary embodiments, for instance, fall within the technical scope of the present invention.

(1) In the first and second exemplary embodiments, the IC tag reader/writer 81 is disposed downstream of the registration roller 29 in the sheet conveying direction and close to the registration roller 29 on the conveyance path L. However, the IC tag reader/writer 81 is disposed at any position on the conveyance path L, such as a position upstream of the registration roller 29 in the sheet conveying direction, between the photosensitive drum 52 and the fixing unit 42 or between the fixing unit 42 and the discharging roller 47, or the like.

(2) In the first exemplary embodiment, a page on which a confidential image is printed is determined by determining whether or not confidential information is added to the head of a print job or the heads of respective pages of the print data. However, a page on which a confidential image is printed may also be determined by analyzing contents of print data on a page-by-page basis and based on whether or not a keyword corresponding to confidential information is included in the analyzed print data.

(3) In the first exemplary embodiment, the PC 60 superimposes a watermark on image data, whereupon print data are transmitted to the printer 1. However, in a case where the printer 1 superimposes image data on the watermark, it is determined whether or not confidential information is added to the head of a print job or the heads of respective pages of print data, or it may also be determined whether or not the print data are a confidential image by determining whether or not a watermark is to be superimposed.

Even in the second exemplary embodiment, when the watermark is superimposed on the image data read by the image reading unit 3, it is determined whether or not the keyword corresponding to confidential information is included in an image through OCR processing, and it may also be determined whether or not the print image are a confidential image by determining whether or not a watermark is to be superimposed.

(4) A plurality of print requests may also be made through the operation section 61 of the PC 60 or the operation section 6 of the printer 1.

(5) Information about sheets to be shred may also be written as distinctive information to be written in the IC tag 80 by the IC tag reader/writer 81. In this case, an IC sheet W or a document W' having a confidential image is likely to be cut into narrow strips by a shredder, so that confidentiality can be enhanced further. The thickness of a sheet varies according to the type of the IC sheet W or the document W', and there is a possibility of emergence of a type of a sheet which can be shred by a shredder and a type of a sheet which cannot be shred. Information about the thickness of a sheet based on the type of the IC sheet W or the document W' may also be written along with distinctive information.

(6) In the first to third exemplary embodiments, it is determined whether or not print data or image information includes confidential information and distinctive information is written into an IC tag. Print data or image information may include security data which is classified into one of a plurality of security levels. In this case, the IC tag reader/writer 81 may write one of the security levels corresponding to the security data included in the print data or the image information, into an IC tag.

A plurality of the foregoing embodiments may also be combined.

What is claimed is:

1. An information writing apparatus comprising:
   a conveying unit configured to convey a recoding medium including an IC tag from a recording medium placing table in a conveying direction;
   a reading unit configured to read image information from an image on a surface of the recording medium including the IC tag while the conveying unit conveys the recording medium;
   a determining unit configured to determine whether or not the image information read by the reading unit includes confidential information based on the image information read by the reading unit; and
   a writing unit which is provided at a downstream side of the conveying unit with respect to the reading unit and configured to write, into the IC tag of the recording medium being conveyed by the conveying unit, distinctive information indicating that confidential information is printed on the recording medium when the determining unit determines that the image information includes confidential information.

2. The image writing apparatus according to claim 1, further comprising a storing unit which stores key information,
   wherein the determining unit determines that the image information includes confidential information when the image information includes the key information.

3. The image writing apparatus according to claim 2, further comprising a recognizing unit which recognizes characters in the image information read by the reading unit,
   wherein the key information includes a keyword, and
   wherein the determining unit determines that the image information includes confidential information when the characters recognized by the recognizing unit include the keyword.

4. The image writing apparatus according to claim 1, wherein the determining unit determines that the image information includes confidential information when the image information includes a watermark.

* * * * *